United States Patent
Lindsay et al.

(10) Patent No.: US 10,214,151 B1
(45) Date of Patent: Feb. 26, 2019

(54) MULTIPURPOSE UTILITY RACK

(71) Applicants: Allen Wesley Lindsay, Mountain Home, UT (US); Jeffery Lynn Wolf, Benjamin, UT (US)

(72) Inventors: Allen Wesley Lindsay, Mountain Home, UT (US); Jeffery Lynn Wolf, Benjamin, UT (US)

( * ) Notice: Subject to any disclaimer, the term of this patent is extended or adjusted under 35 U.S.C. 154(b) by 0 days.

(21) Appl. No.: 15/729,430

(22) Filed: Oct. 10, 2017

(51) Int. Cl.
| | | |
|---|---|---|
| *B60R 7/08* | (2006.01) | |
| *B60R 9/06* | (2006.01) | |
| *B60R 11/00* | (2006.01) | |
| *B60R 11/06* | (2006.01) | |
| *B60P 3/34* | (2006.01) | |
| *A47B 13/00* | (2006.01) | |
| *B60Q 1/26* | (2006.01) | |

(52) U.S. Cl.
CPC .............. *B60R 7/08* (2013.01); *A47B 13/003* (2013.01); *B60P 3/34* (2013.01); *B60Q 1/2661* (2013.01); *B60R 9/06* (2013.01); *B60R 11/00* (2013.01); *B60R 11/06* (2013.01); *A47B 2013/006* (2013.01); *B60R 2011/004* (2013.01); *B60R 2011/0066* (2013.01); *B60R 2011/0071* (2013.01)

(58) Field of Classification Search
CPC .. B60R 7/08; B60R 9/06; B60R 11/00; B60R 11/06; B60R 2011/0071; B60R 2011/004; B60R 2011/0066; B60Q 1/2661; A47B 13/003; A47B 2013/006; B60P 3/34
USPC .............. 135/88.07, 88.11, 88.15, 88.16, 96; 296/163, 165
See application file for complete search history.

(56) References Cited

U.S. PATENT DOCUMENTS

| | | | | |
|---|---|---|---|---|
| D139,005 S | * | 10/1944 | Adams ................. | 211/126.1 |
| 4,098,486 A | * | 7/1978 | Hornsby ............... | A47B 23/00 |
| | | | | 108/159 |
| 4,974,526 A | * | 12/1990 | Wiygul, Jr. .......... | A47B 3/002 |
| | | | | 108/157.1 |
| 5,715,956 A | * | 2/1998 | Yoshida ............... | A47B 47/0033 |
| | | | | 211/182 |
| 5,762,004 A | * | 6/1998 | Vashon ................. | A47B 3/08 |
| | | | | 108/128 |
| 7,055,834 B1 | * | 6/2006 | White ................... | A47B 31/00 |
| | | | | 280/35 |
| D580,860 S | * | 11/2008 | Xi-Ren ................ | D13/122 |
| D747,269 S | * | 1/2016 | Larrabee ............. | D13/122 |
| 9,615,657 B2 | * | 4/2017 | Ortega ................. | A47B 13/02 |
| 2007/0095770 A1 | * | 5/2007 | Backofen ............. | A01K 63/003 |
| | | | | 211/133.1 |

(Continued)

*Primary Examiner* — Ko H Chan
(74) *Attorney, Agent, or Firm* — Malone IP Law; Steven J. Malone

(57) ABSTRACT

A multipurpose utility rack of a UTV (utility task vehicle) is disclosed. The utility rack includes an upper assembly containing a rectangular portion that rigidly connects a first side rail parallel to a second side rail, a first side assembly forming a third side rail with one or more brackets that connects the first side assembly to the upper assembly, a second side assembly forming a fourth side rail with one or more brackets that connect the second side assembly to the upper assembly, wherein the first side assembly and the second side assembly connect to the upper assembly with the third side rail parallel to the fourth side rail, with the third side rail perpendicular to the first side rail, and with the fourth side rail perpendicular to the second side rail.

16 Claims, 14 Drawing Sheets

(56) References Cited

U.S. PATENT DOCUMENTS

2009/0007948 A1* 1/2009 Dempsey ................ B60P 3/341
　　　　　　　　　　　　　　　　　　　　　　　135/96

* cited by examiner

MULTIPURPOSE UTILITY RACK

BACKGROUND

Field of the Invention

The present invention discloses a utility rack with structural features which allow for multipurpose use.

SUMMARY

A multipurpose utility rack of a UTV (utility task vehicle) is disclosed. The utility rack includes an upper assembly containing a rectangular table portion that rigidly connects a first side rail parallel to a second side rail, a first side assembly forming a third side rail with one or more brackets that reversibly connect the first side assembly to the upper assembly, a second side assembly forming a fourth side rail with one or more brackets that reversibly connect the second side assembly to the upper assembly, wherein the first side assembly and the second side assembly connect to the upper assembly with the third side rail parallel to the fourth side rail, with the third side rail perpendicular to the first side rail, and with the fourth side rail perpendicular to the second side rail, and a first brace adjustably attached between the first side assembly and the second side assembly.

The multipurpose utility rack may include a first side rail and the second side rail each having an overall length between 50 inches and 62 inches. The multipurpose utility rack may include a third side rail and a fourth side rail each having an overall length between 25 inches and 40 inches. The multipurpose utility rack may include a first side assembly and a second side assembly each further comprising a generally flat section with one or more mounting holes. The multipurpose utility rack first side assembly and the second side assembly each may further comprise a generally flat section with one or more mounting holes, the mounting holes suitable for mounting the utility rack to a ground surface by driving a ground stake through the one or more mounting holes. The multipurpose utility rack may have an overall height of between 28 inches and 32 inches measured from the generally flat mounting base to the top of the rails. The utility rack may be usable as a dining table, game table, card table, preparation table, staging table, or storage table. The utility rack may include a first side rail, a second side rail, a third side rail, and a forth side rail which form a top portion of the utility rack with eight corners. The eight corners of the top portion may include eight rounded non-intersecting disconnected corners. The utility rack first side assembly or the second side assembly may further include one or more D-ring connectors. The utility rack first side assembly or the second side assembly may further include one or more hooks, clamps, hinges, or fasteners. The utility rack may include one or more hooks, clamps, hinges, or fasteners are used to support one or more tools, containers, doors, weapons, camping gear, fencing supplies, outdoor gear, surveying tools, water containers, fuel containers, drawers, lock boxes, gardening supplies, or hunting gear. The utility rack top portion may include one or more lights attached to the first side rail, the second side rail, the third side rail, or the forth side rail. The utility rack may include one or more lights powered by solar power. The utility rack first side assembly and the second side assembly may further include support structure and a second brace adjustably attached between the first side assembly and the second side assembly such that spools of wire, fencing, barbed wire, electrical wire, or hose can be spooled rotationally around an axis formed by the second brace. The utility rack may include one or more mounting holes used to mount the utility rack to a vehicle. The utility rack may be attached to a four wheel drive vehicle. The utility rack may be attached to a UTV (utility task vehicle), SxS (side-by-side vehicle), a utility vehicle, or an off-road vehicle. The utility rack first side rail, second side rail, third side rail, or forth side rail may further comprise an extendable canopy. The utility rack extendable canopy may comprise one or more support arms extendable to support the canopy in an extended canopy position. The utility rack rectangular table portion may further comprise an extendable canopy.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
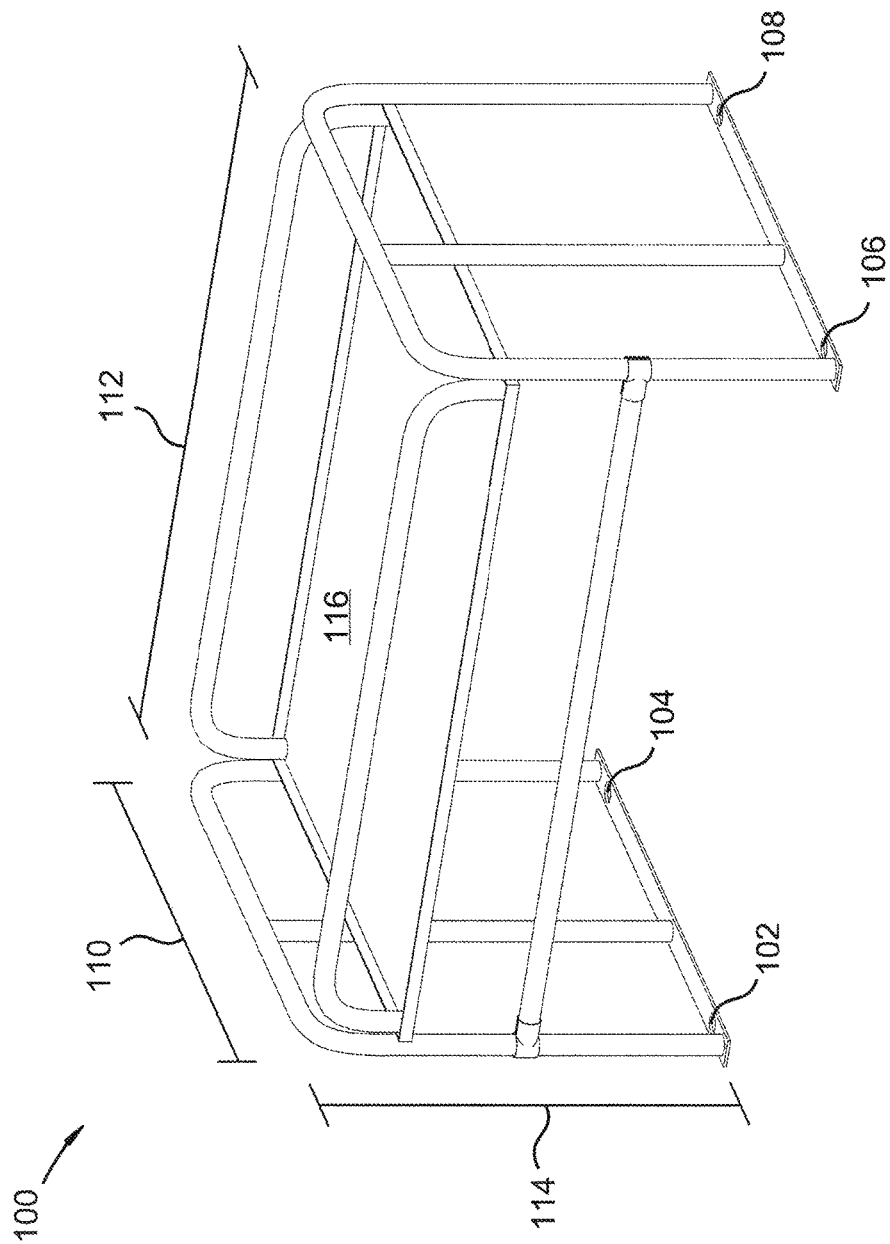
FIG. 1 shows a multipurpose utility rack with specific dimensions which allow for varied uses in accordance with an embodiment of the invention.

FIG. 1 shows a multipurpose utility rack 100 with specific dimensions 114, 110, 112 which allow for varied uses in accordance with an embodiment of the invention. Holes 102-108 are through holes formed on base sections 216, 226 of first and second side assemblies 210, 220 (shown in FIG. 2). The base sections 216, 226 contain mounting holes 102, 104, 106, 108 for mounting utility rack 100 to a vehicle or securing the utility rack to the ground using one or more ground stakes 510. Mounting holes 102, 104, 106, 108 may be ½ inch to 2 inches in diameter. Overall height dimension 114 may be in a range between 28-32 inches allowing utility rack 100 to be used as a table. Items on table portion 116 may be accessible to individuals while sitting in one or more chairs 508 surrounding table portion 116 while utility rack 100 is on the ground 506. Dimension 112 is showing an overall length of first side rail 208 and second side rail 244 which may be between 50 and 62 inches. Dimension 110 shows an overall length of third and fourth side rails which may be between 25 and 40 inches. Dimensions 114, 110, and 112 allow utility rack 100 to be mounted to a UTV (utility task vehicle) and be used as a table.

Figure 2:
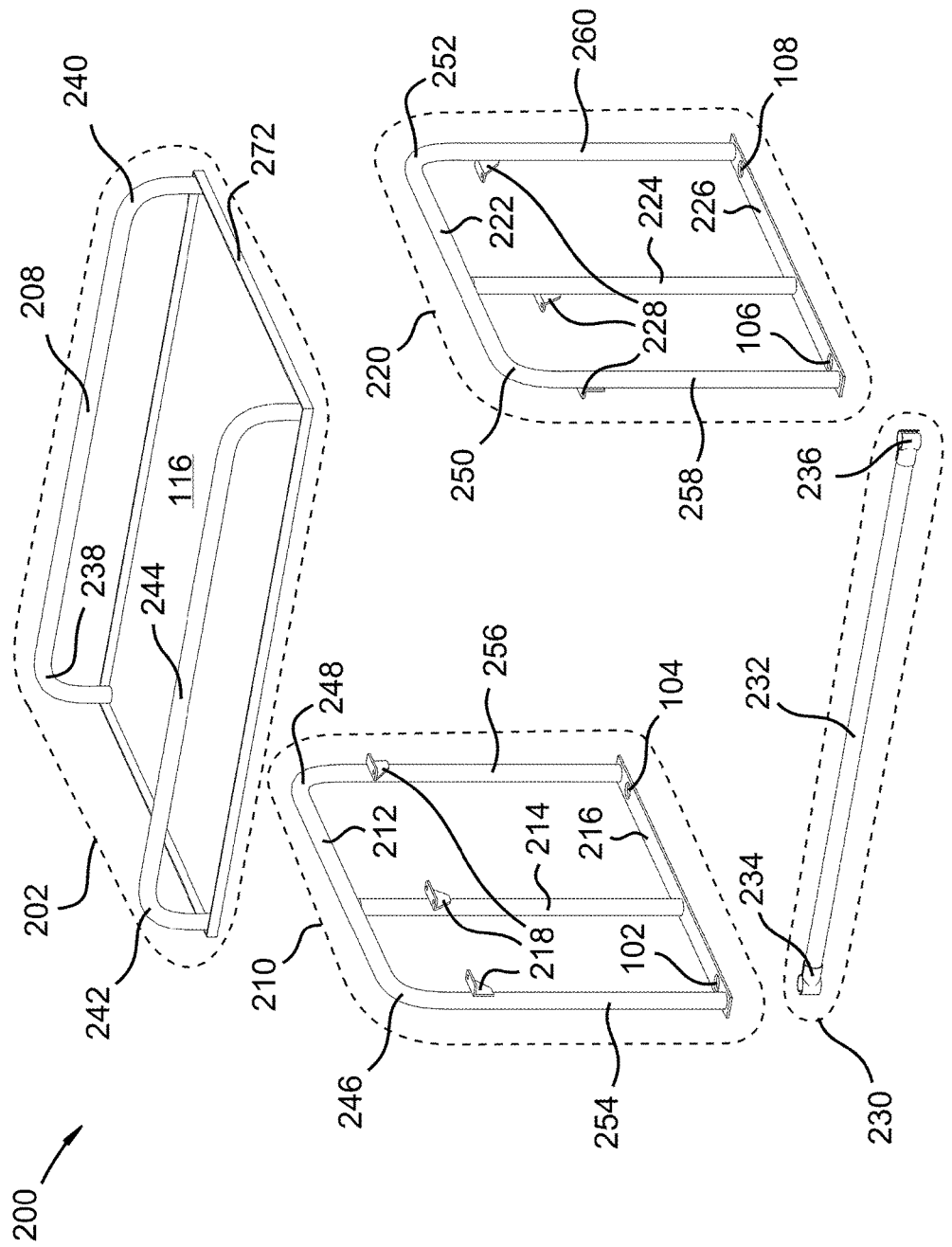
FIG. 2 shows disassembled assemblies of the multipurpose utility rack in accordance with an embodiment of the invention.

FIG. 2 shows disassembled assemblies 200 of the multipurpose utility rack in accordance with an embodiment of the invention. Upper assembly 202 is shown with a rectangular table portion 116, a first side rail 208, and a second side rail 244. First and second side rails 208 and 244 are firmly attached to table portion 116. The first and second side rails 208 and 244 create four disconnected, non-intersecting, rounded corners 238, 240, 242 and 244. The rails may be made of round tubing material. Table portion 116 may be a solid sheet of metal, plastic, wood, composite materials, carbon fiber materials, or a combination thereof. Table portion 116 may include frame pieces 272 surrounding table portion 116. Frame pieces 272 may be angle iron, square tubing, round tubing, flat metal, or any other known materials used to add rigidity and strength to structures. Table portion 116 rigidly connects first side rail 208 parallel to second side rail 244.

A first side assembly 210 forms a third side rail 212. First side assembly 210 may be formed from metal, plastic, wood, composite materials, carbon fiber materials, or a combination thereof. Third side rail 212 comprises rounded corners 246 and 248. These rounded corners do not directly attach to the rounded corners 242, 238, 240, or 244 of the first and second side rails. The rounded corners help keep things like tree limbs and other brush from catching on the utility rack 603 when attached to a UTV 602 (see FIG. 6). First side assembly 210 contains one or more mounting brackets 218 for reversibly fixing upper assembly 202 to first side assembly 210. First side assembly 210 includes a generally flat base section 216. Base sections 216, 226 contain mounting holes 102, 104, 106, 108 for mounting utility rack 100 to a vehicle or securing the utility rack to the ground using one or more ground stakes 510. Mounting holes 102, 104, 106, 108 may be ½ inch to 2 inches in diameter.

A second side assembly 220 forms a fourth side rail 222. Second side assembly 220 may be formed from metal, plastic, wood, composite materials, carbon fiber materials, or a combination thereof. Fourth side rail 222 comprises rounded corners 250 and 252. These rounded corners do not directly attach to the rounded corners 242, 238, 240, or 244 of the first and second side rails. The rounded corners of the first, second, third, and fourth side rails form eight non-intersecting rounded corners and form a single plane along the top edges of the rails. The rounded corners help keep things like tree limbs and other brush from catching on the utility rack 603 when attached to a UTV 602 (see FIG. 6). UTVs are often taken to heavily wooded areas or areas with terrain unsuited for normal vehicles. Second side assembly 220 contains one or more mounting brackets 228 for reversibly fixing upper assembly 202 to second side assembly 220. Second side assembly 220 includes a generally flat base section 226. Base sections 216, 226 contain mounting holes 102, 104, 106, 108 for mounting utility rack 100 to a vehicle or securing the utility rack to the ground using one or more ground stakes 510 (see FIG. 5). Mounting holes 102, 104, 106, 108 may be ½ inch to 2 inches in diameter.

A first brace 232 is shown with brace mounts 234 and 236. First brace 232 provides structural support for utility rack 100 while also providing added utility of supporting one or more seats 1012 and 1010 (see FIG. 10). First brace 232 is adjustably attached between the first side assembly 210 and the second side assembly 220. The adjustability allows the first brace to be positioned in a convenient position for a driver of a UTV allowing the driver to see a less obstructed rearview while driving UTV 1102 (see FIG. 11). Brace mounts 234 and 236 may be tightened by pressure using a screw, bolt, or clamping mechanism.

Figure 3:
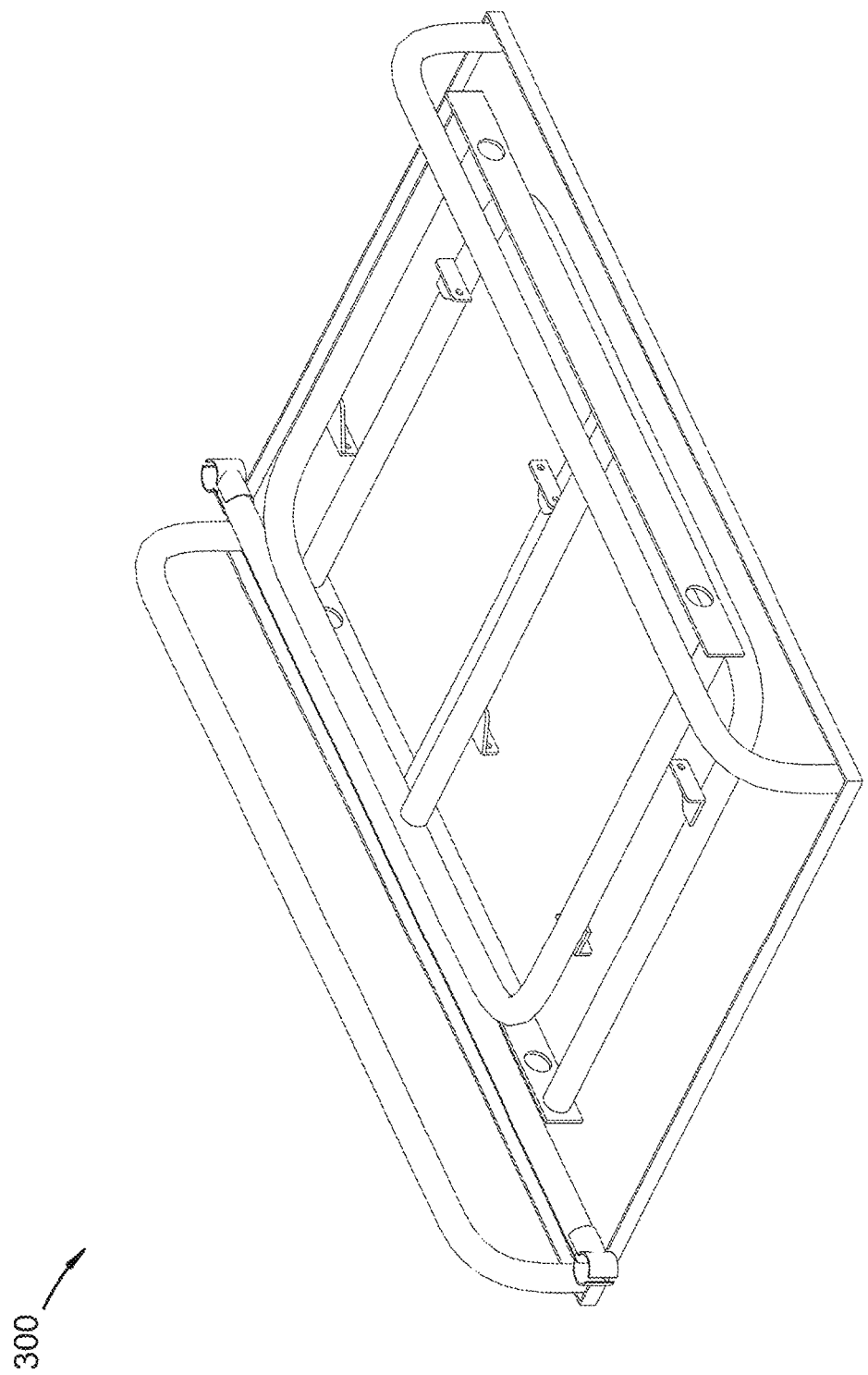
FIG. 3 shows a compact shipping view of disassembled assemblies of the multipurpose utility rack in accordance with an embodiment of the invention.

FIG. 3 shows a compact shipping view 300 of disassembled assemblies 202, 210, 220 of the multipurpose utility rack in accordance with an embodiment of the invention. The sizes and shapes of the assemblies allow for easy compacting and shipping of the utility rack 300.

Figure 4:
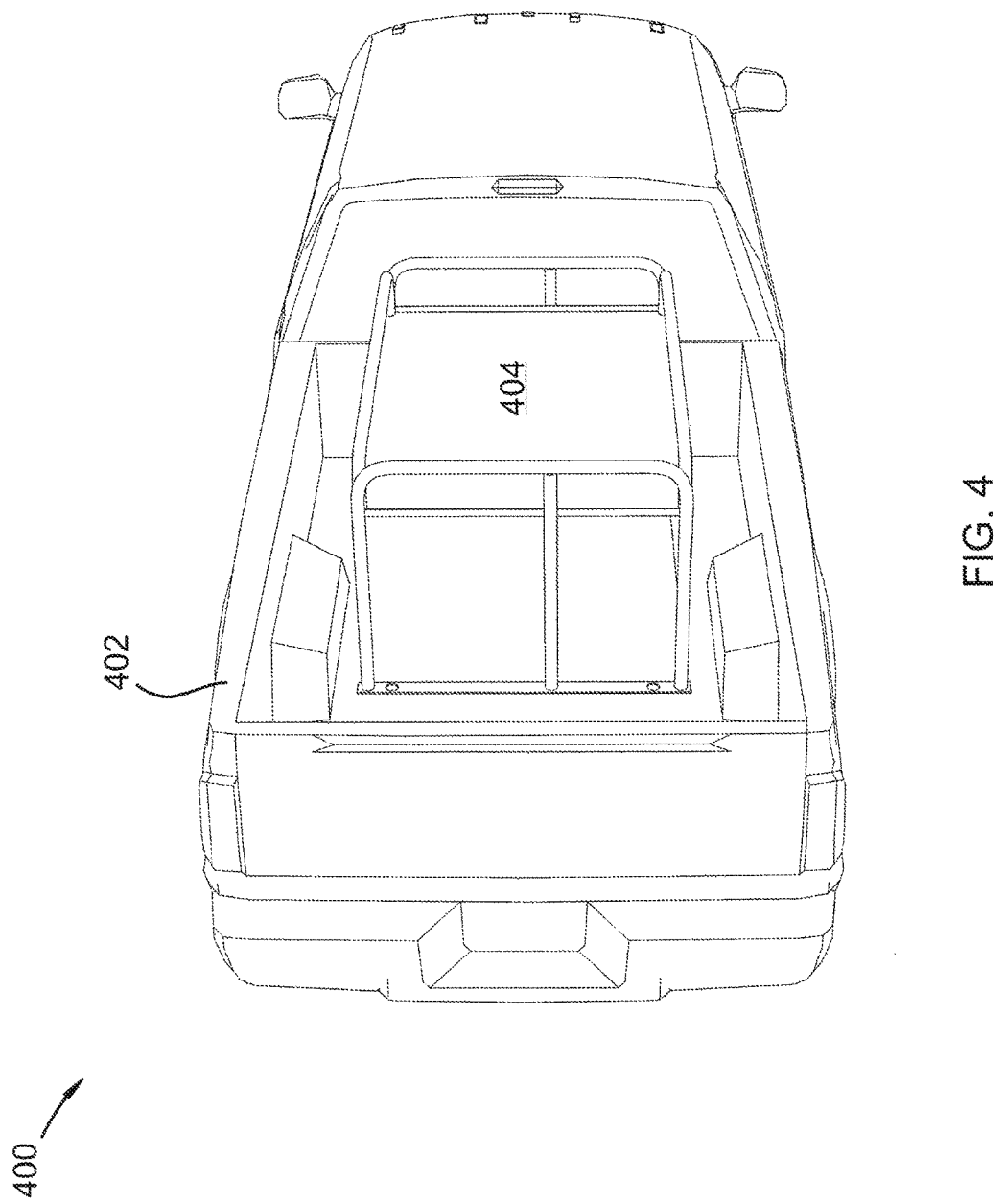
FIG. 4 shows a multipurpose utility rack in the back of a standard pickup truck.

FIG. 4 shows a multipurpose utility rack 404 in the back of a standard pickup truck 402. This view 400, illustrates the size of the utility rack compared to that of a pickup truck bed.

Figure 5:
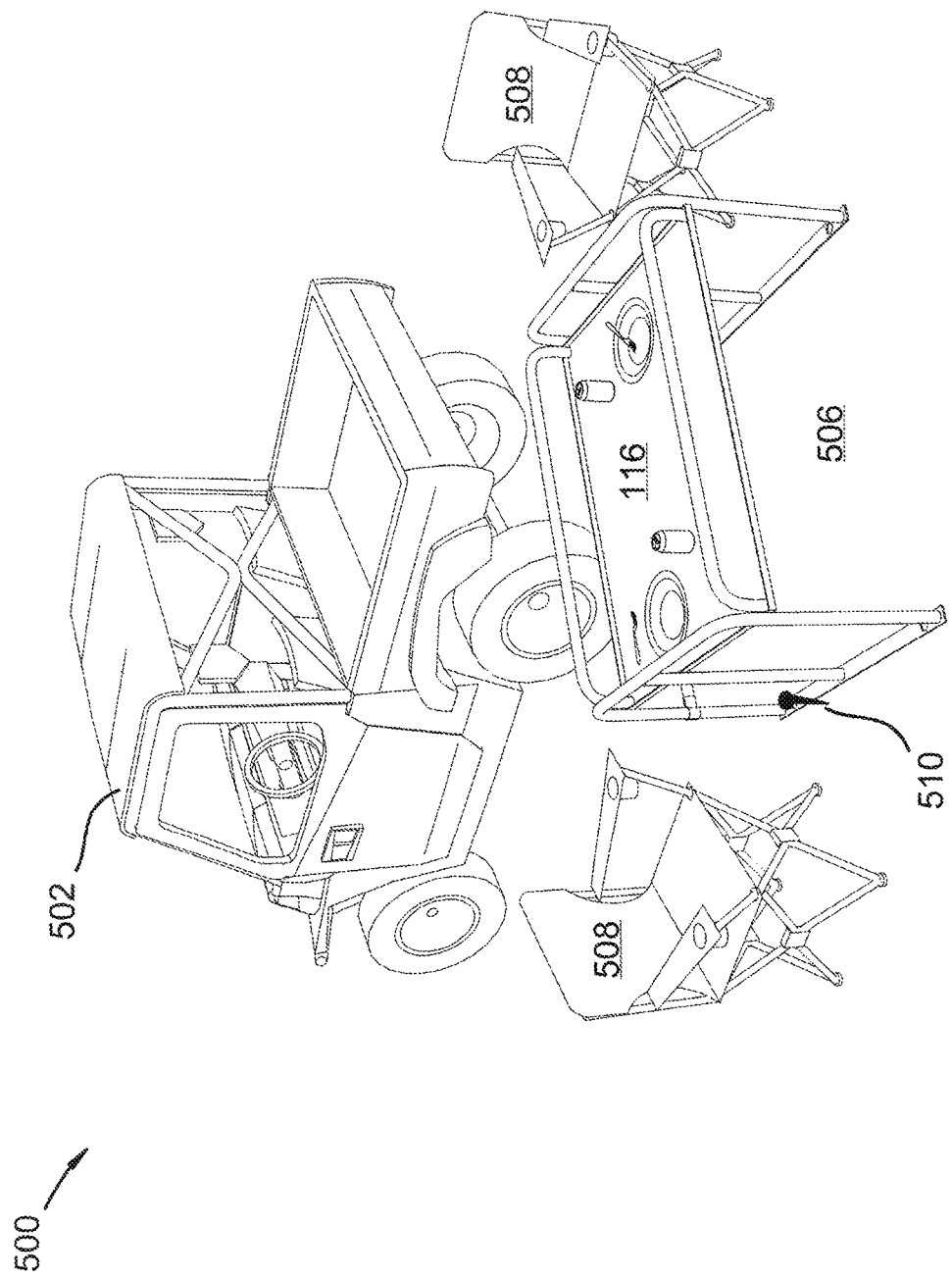
FIG. 5 shows a multipurpose utility rack being used as a dining table in accordance with an embodiment of the invention.

FIG. 5 shows a multipurpose utility rack being used as a dining table 116 in accordance with an embodiment of the invention. UTV 502 drove to a camping spot with the utility rack attached to the UTV. Upon arrival, the utility rack was taken off of the UTV and used as a dining table. Ground stake 510 was used to secure the utility table to the ground 506. Individuals are able to sit in chairs 508 and easily access item on table portion 116 of the utility rack.

Figure 6:
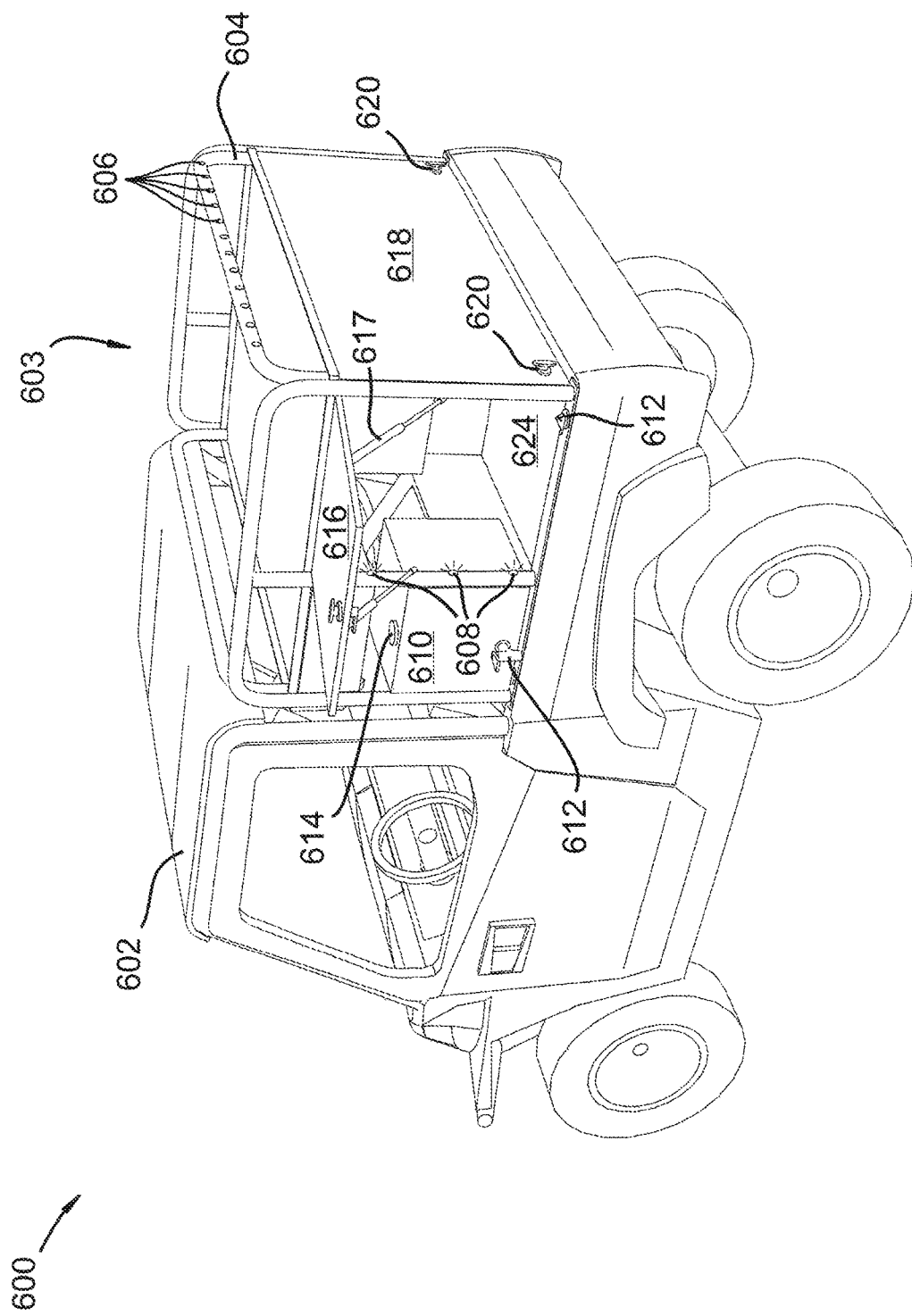
FIG. 6 shows a multipurpose utility rack attached to a UTV in accordance with an embodiment of the invention.

FIG. 6 shows a multipurpose utility rack attached to a UTV in accordance with an embodiment of the invention. UTV 602 has utility rack 603 mounted to the UTV bed using mounts 612. Mounts 612 push through holes 102-108 and attach the utility rack to the UTV bed by a pressure fitting caused by mounts 612. The UTV bed may have one or more holes or hardware for assisting in the mounting of the utility rack to the UTV bed. Shown here is a UTV with holes which match the mounting holes 102-108. The mounts 612 push partially through the mounting holes 102-108 and extend into holes in the UTV bed and create a pressure fit as a lever actuator is closed on top of the mounts 612. This type of mount allows for fast securing and removal of the utility rack from the UTV. Doors 618 and 616 may be used to secure items or animals within storage area 624. Latches 620 may be used to lock and secure doors 618 and 616. Hinges and standard door hardware may be used to attach and hold open doors 616 and 618. Gas filled actuators 617 may be used to keep doors 616 and 618 in an open position. Lights 606 and 608 may be used to provide interior and exterior lighting. When door 616 or door 618 is opened lights 608 may illuminate an interior portion of the utility rack. Lights 606 and 608 may have wiring which runs through structural features of utility rack 603 such as hollow side rail tubing. Lights 606 and 608 may be powered by a battery of the UTV.

Additionally and alternatively, the lights 606 and 608 may be powered by a solar panel attached to the UTV or positioned near the UTV. A water and or fuel container 610 may be mounted to utility rack 603. A fill cap 614 and a dispensing port 612 may be positioned for ease of access as shown in 600.

Figure 7:
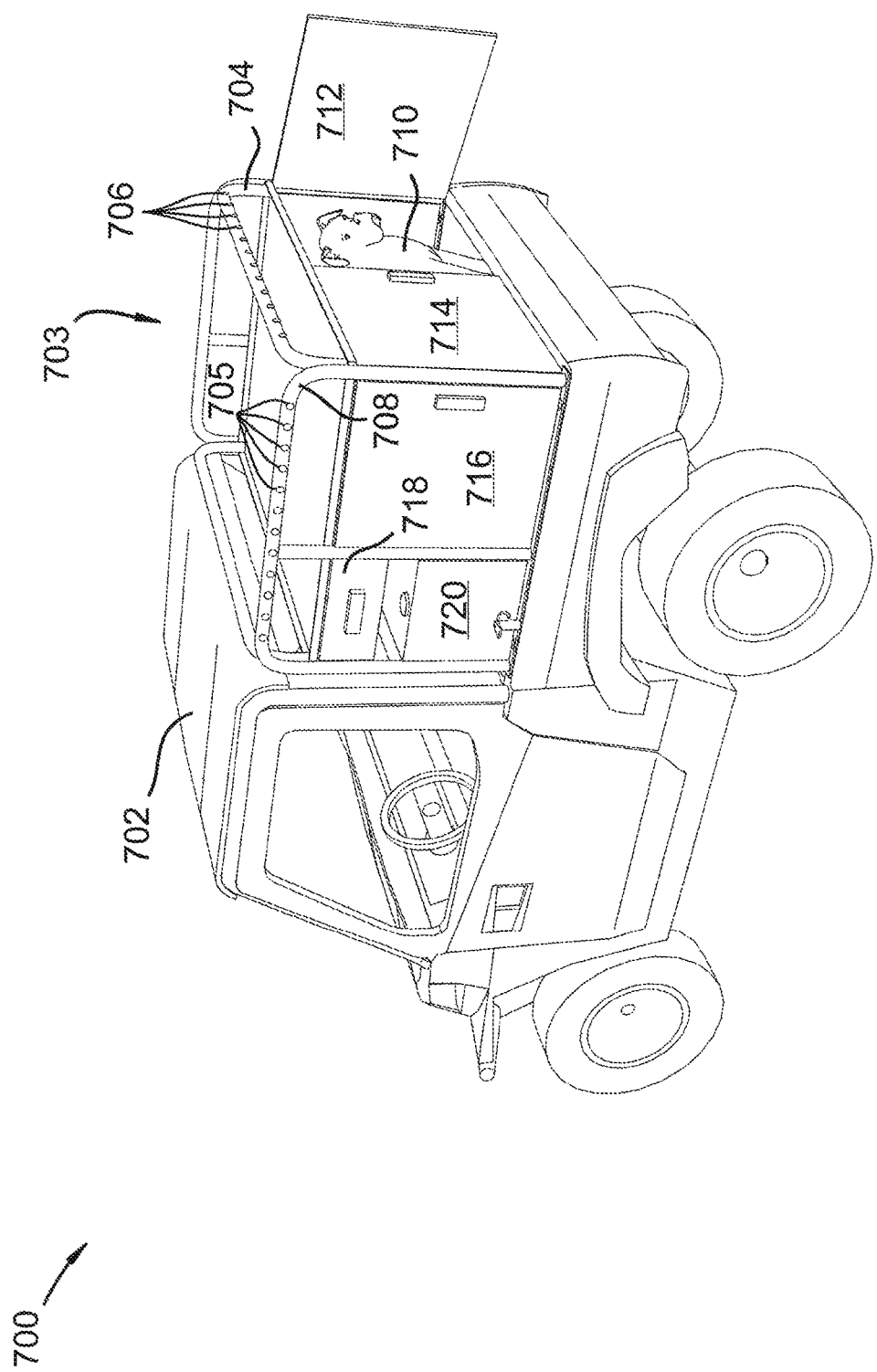
FIG. 7 shows a multipurpose utility rack attached to a UTV in accordance with an embodiment of the invention.

FIG. 7 shows a multipurpose utility rack attached to a UTV in accordance with an embodiment of the invention. UTV 702 has utility rack 703 mounted to the UTV bed using screw mounts. Doors 716 and 712 may be used to secure items or animals 710 within an enclosed storage area. Hinges and standard door hardware may be used to attach and hold open doors 716 and 712. Lights 706 and 705 may have wiring which runs through structural features of utility rack 703 such as hollow side rail tubing. Lights 706 and 705 may be powered by a battery of the UTV. Additionally and alternatively, the lights 706 and 705 may be powered by a solar panel attached to the UTV or positioned near the UTV. A water and or fuel container 720 may be mounted to utility rack 703.

Figure 8:
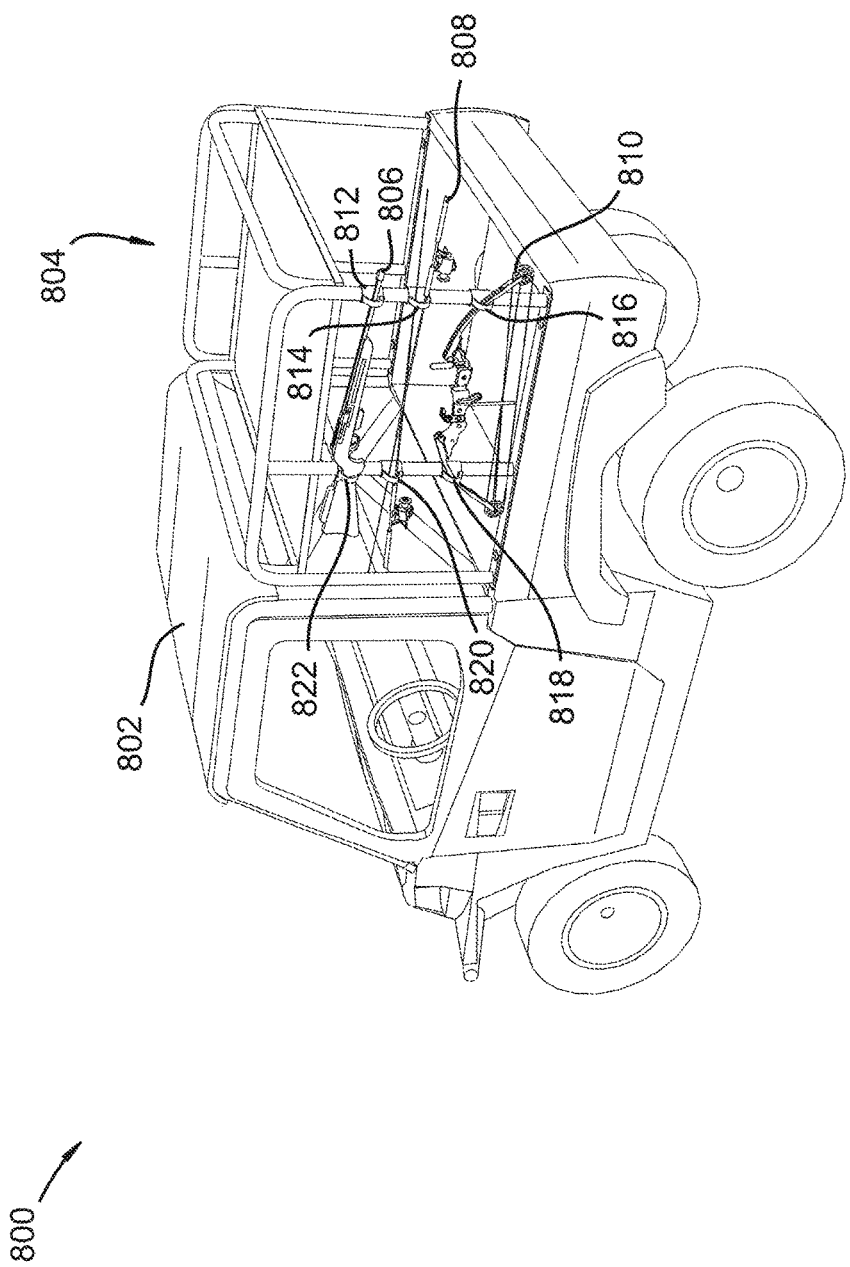
FIG. 8 shows a multipurpose utility rack attached to a UTV in accordance with an embodiment of the invention.

FIG. 8 shows a multipurpose utility rack attached to a UTV in accordance with an embodiment of the invention. UTV 802 has utility rack 804 mounted to the bed of the UTV. Utility rack 804 contains hardware 812-822 for mounting weapons 806, 810 and fishing poles 808 to the utility rack. Hardware 812-822 may include one or more D-ring connectors, hooks, clamps, hinges, or fasteners. The hardware 812-822 may be used to support one or more tools, containers, doors, weapons, camping gear, fencing supplies, outdoor gear, surveying tools, water containers, fuel containers, drawers, lock boxes, gardening supplies, or hunting gear.

Figure 9:
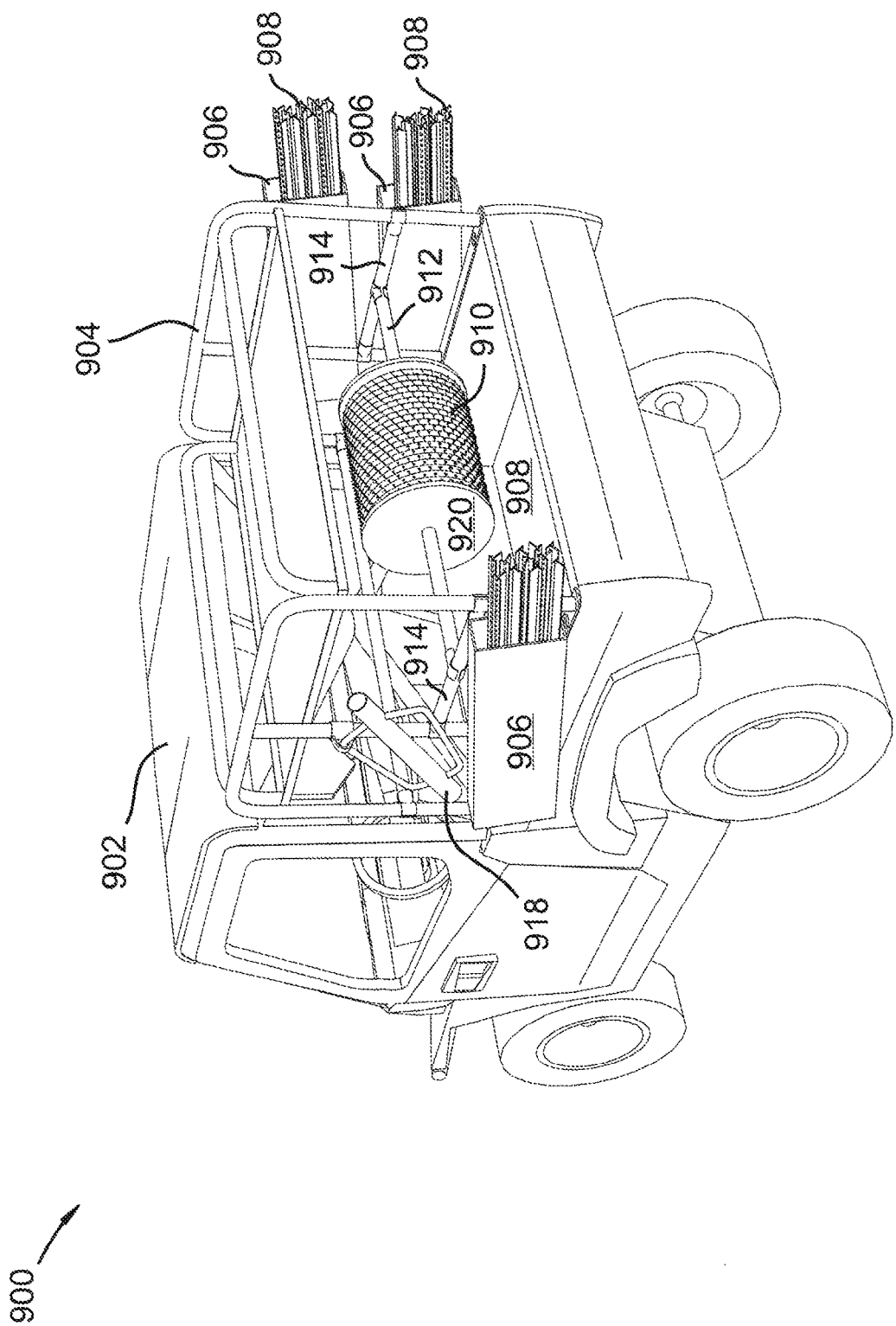
FIG. 9 shows a multipurpose utility rack attached to a UTV in accordance with an embodiment of the invention.

FIG. 9 shows a multipurpose utility rack attached to a UTV in accordance with an embodiment of the invention. UTV 902 has utility rack 904 mounted to the bed of the UTV. Utility rack 904 contains hardware 912-914 attached to the utility rack 904 for mounting reel 920, boxes 906, poles 908 and pole installation tools 918 to the utility rack. A second adjustable brace 912 is connected between the first side assembly such that spools of wire, fencing, barbed wire, electrical wire, or hose can be spooled rotationally around an axis formed by the second brace. Reel 910 may contain fencing materials such as barbed wire. Reel 910 may also contain electrical wiring or hose material which can be spooled on and off of reel 920 as UTV 902 moves or while standing still. Hardware 912-914 may include one or more poles, boxes, D-ring connectors, hooks, clamps, hinges, or fasteners. The hardware 912-914 may be used to support one or more tools, containers, doors, weapons, camping gear, fencing supplies, outdoor gear, surveying tools, water containers, fuel containers, drawers, lock boxes, gardening supplies, or hunting gear.

Figure 10:
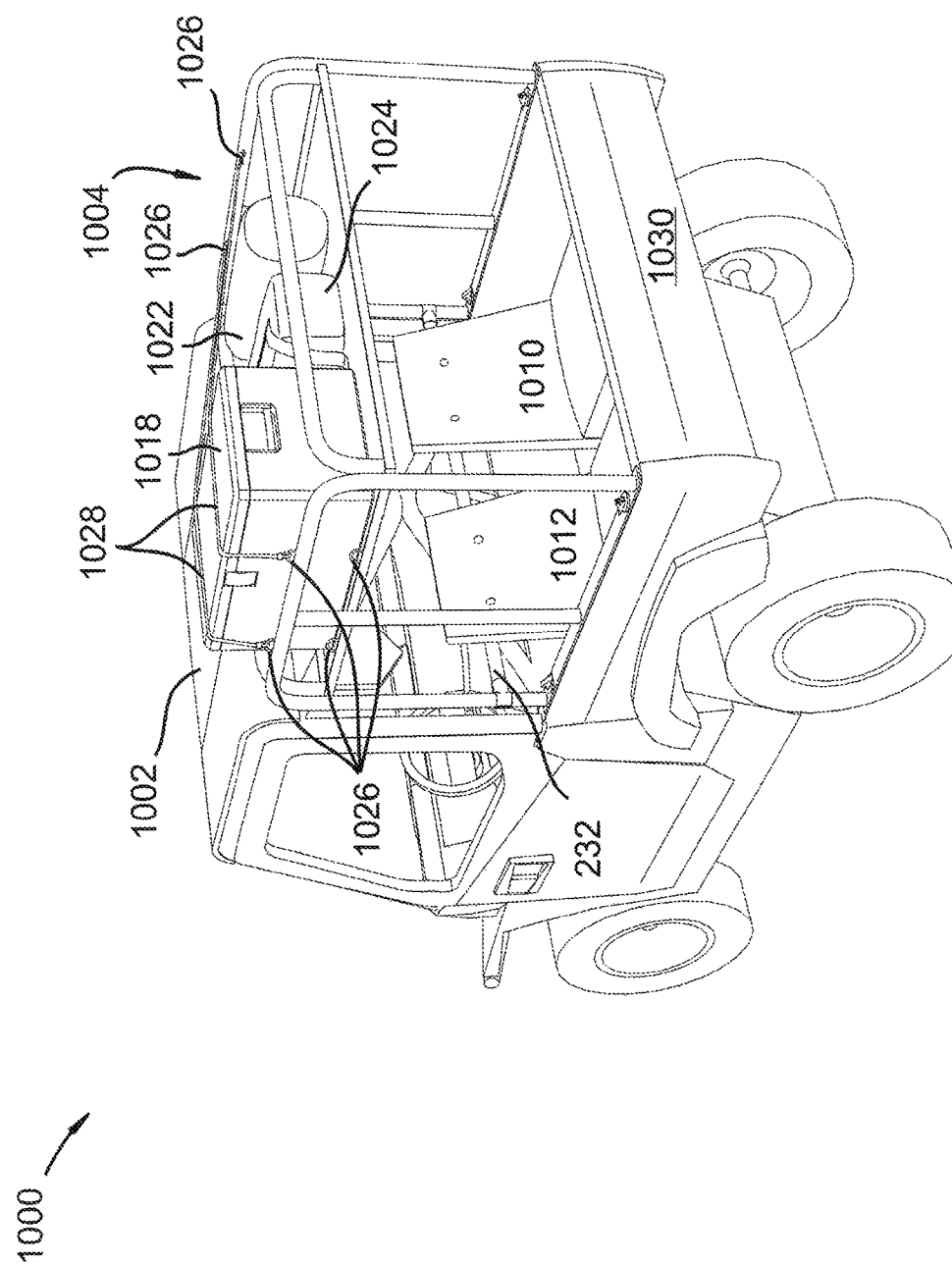
FIG. 10 shows a multipurpose utility rack attached to a UTV in accordance with an embodiment of the invention.

FIG. 10 shows a multipurpose utility rack attached to a UTV in accordance with an embodiment of the invention. UTV 1002 has utility rack 1004 mounted to the bed of the UTV. Utility rack 1004 contains hardware 1026 attached to the utility rack 1004 for mounting gear 1018, 1022, 1024 to the utility rack. Gear 1018, 1022, and 1024 may be strapped to utility rack 1004 using D-ring type hardware 1026 and straps 1028 or bungee cords 1028. Hardware loops 1026 may by welded to one or more rails, frames, or structural elements of utility rack 1004. Seats 1010 and 1012 may contain brackets for mounting the seats to first brace 232. Tailgate 1030 may be lowered when one or more individuals are using seats 1012 and 1010. Seats 1010 and 1012 may include seat belts and/or seat belts may be fastened to the UTV.

Figure 11:
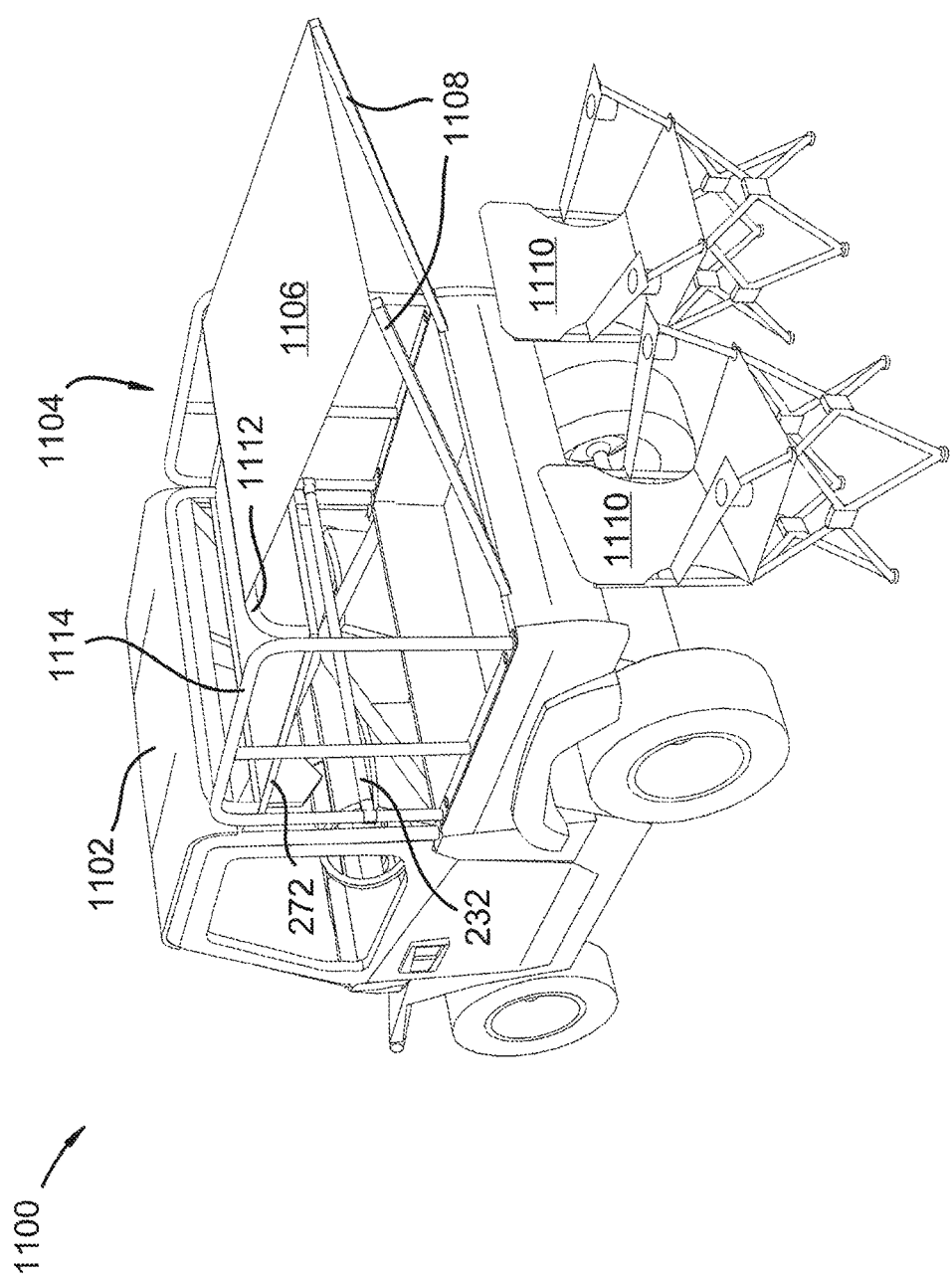
FIG. 11 shows a multipurpose utility rack attached to a UTV in accordance with an embodiment of the invention.

FIG. 11 shows a multipurpose utility rack attached to a UTV in accordance with an embodiment of the invention. UTV 1102 has utility rack 1104 mounted to the bed of the UTV. Utility rack 1104 contains hardware attached to the utility rack 1104 for mounting one or more canopies 1106 to the utility rack. Canopy 1106 may roll into rail(s) 1112, 1114 or may be an external canopy assembly attached to rail(s) 1112 and/or 1114. Items 1110 may be protected from sun and rain while canopy 1106 is extended. Canopy supports 1108 may be telescoping and/or may hinge to store and setup canopy 1106.

Figure 12:
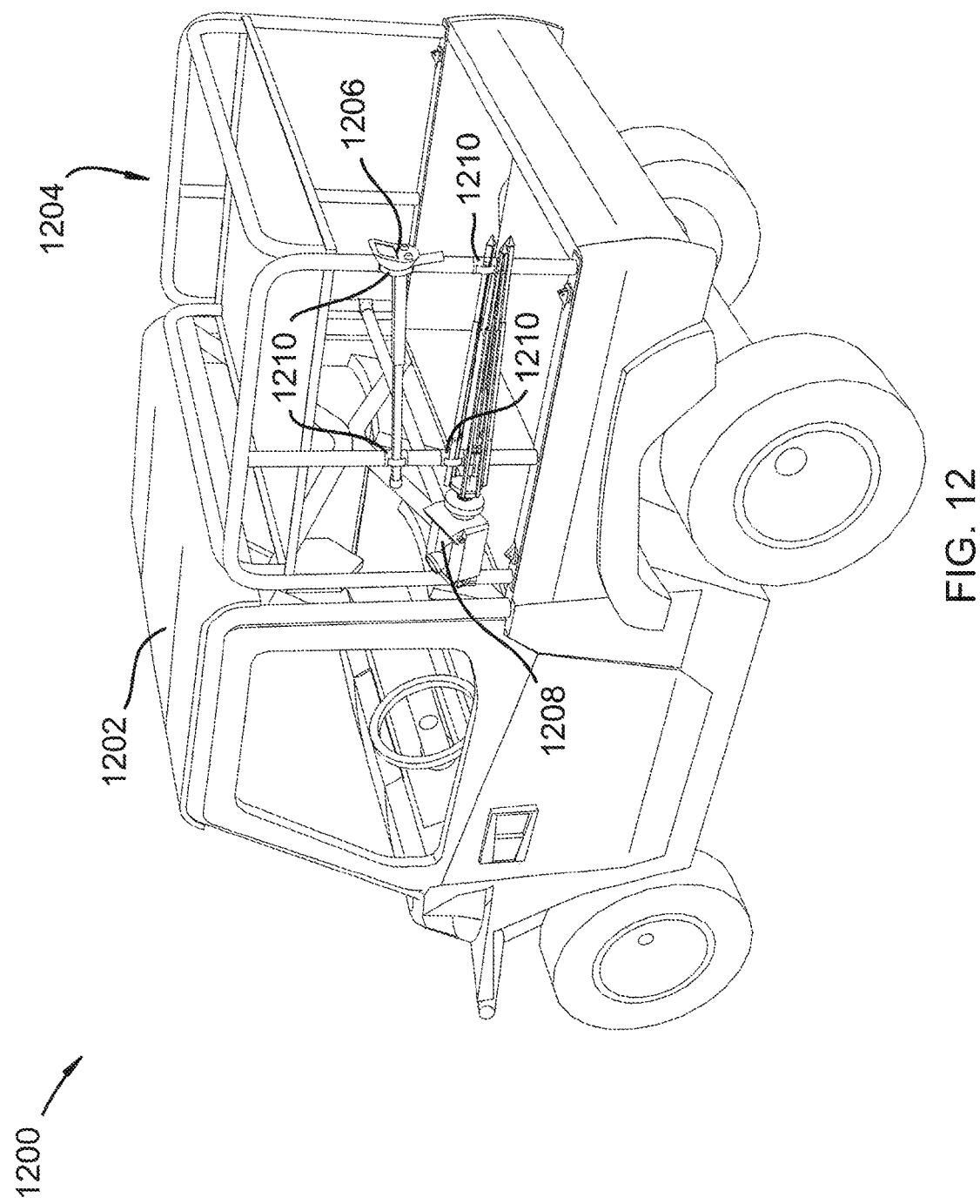
FIG. 12 shows a multipurpose utility rack attached to a UTV in accordance with an embodiment of the invention.

FIG. 12 shows a multipurpose utility rack attached to a UTV in accordance with an embodiment of the invention. UTV 1202 has utility rack 1204 mounted to the bed of the UTV. Utility rack 1204 contains hardware 1210 attached to the utility rack 1204 for mounting one or more surveying tools 1208 and 1206 to the utility rack. Hardware 1210 may include one or more D-ring connectors, hooks, clamps, hinges, or fasteners. The hardware 1210 may be used to support one or more tools, containers, doors, weapons, camping gear, fencing supplies, outdoor gear, surveying tools, water containers, fuel containers, drawers, lock boxes, gardening supplies, or hunting gear.

Figure 13:
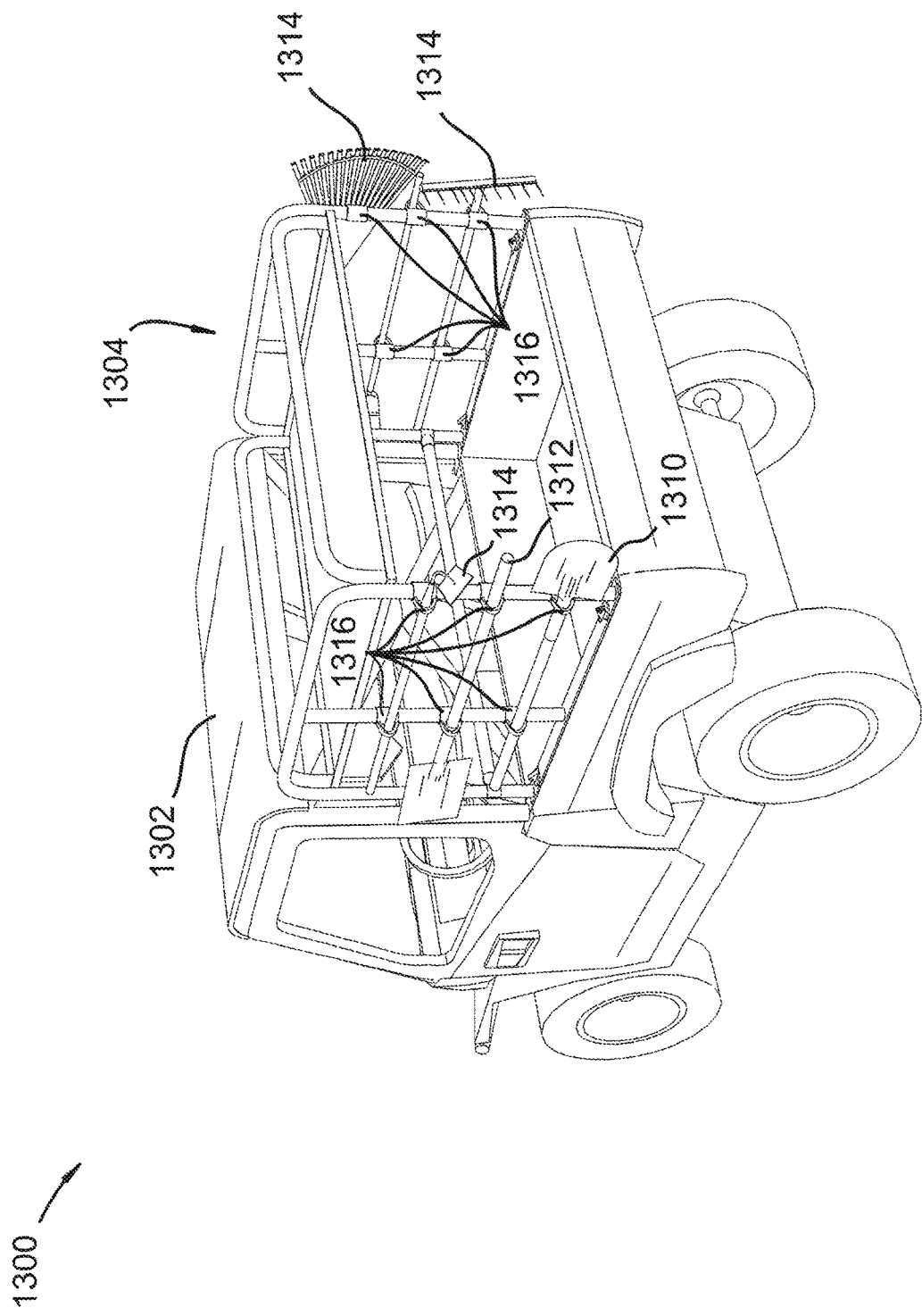
FIG. 13 shows a multipurpose utility rack attached to a UTV in accordance with an embodiment of the invention.

FIG. 13 shows a multipurpose utility rack attached to a UTV in accordance with an embodiment of the invention. UTV 1302 has utility rack 1304 mounted to the bed of the UTV. Utility rack 1304 contains hardware 1316 attached to the utility rack 1304 for mounting one or more gardening tools 1310, 1312, and 1314 to the utility rack. Hardware 1316 may include one or more D-ring connectors, hooks, clamps, hinges, or fasteners. The hardware 1316 may be used to support one or more tools, containers, doors, weapons, camping gear, fencing supplies, outdoor gear, surveying tools, water containers, fuel containers, drawers, lock boxes, gardening supplies, or hunting gear.

Figure 14:
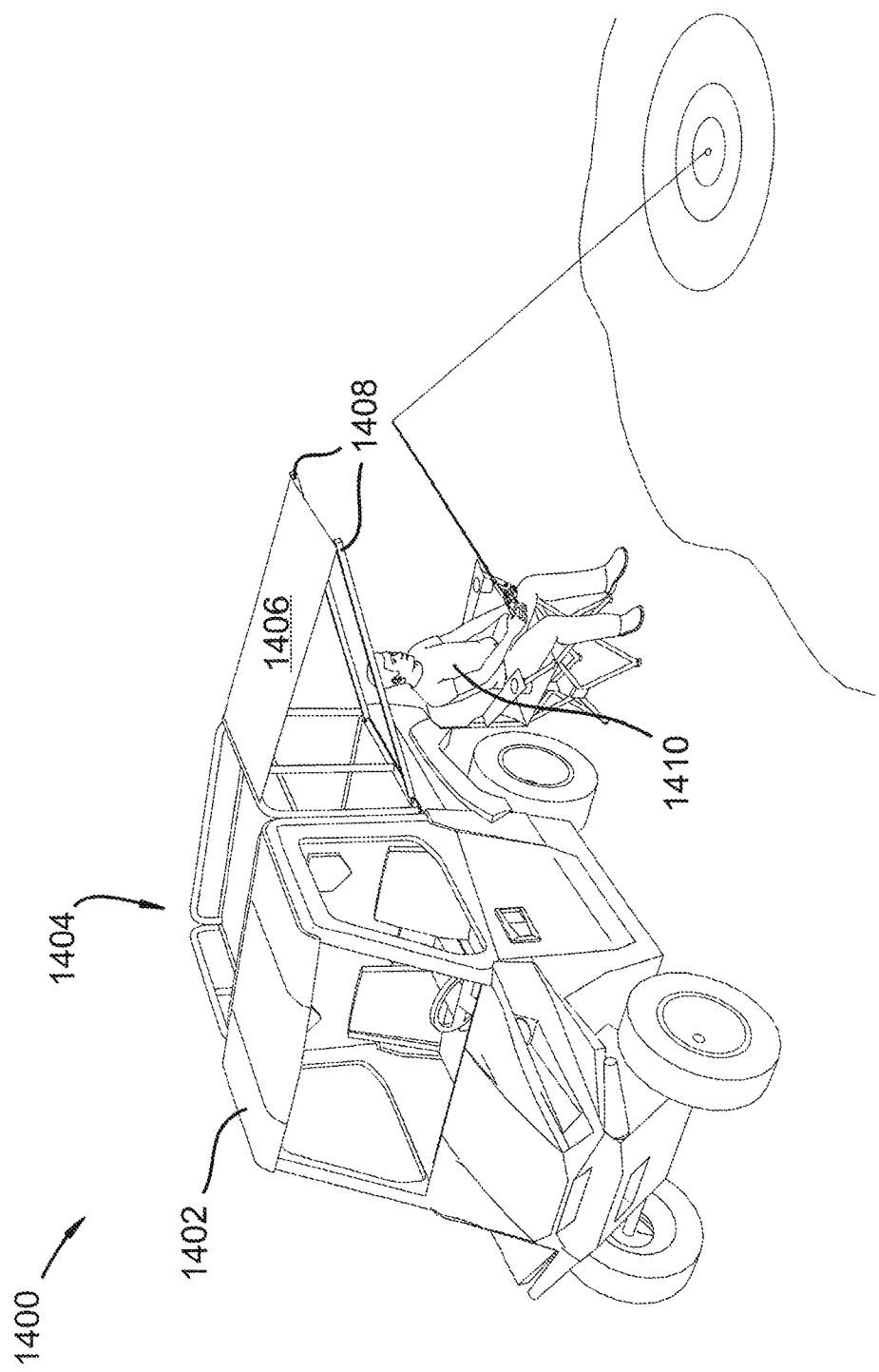
FIG. 14 shows a multipurpose utility rack attached to a UTV in accordance with an embodiment of the invention.

FIG. 14 shows a multipurpose utility rack attached to a UTV in accordance with an embodiment of the invention. UTV 1402 has utility rack 1404 mounted to the bed of the UTV. Utility rack 1404 contains hardware attached to the utility rack 1404 for mounting one or more canopies 1406 to the utility rack. Canopy 1106 may roll into a rail or may be an external canopy assembly attached to one or more rails. Person 1410 may be protected from sun and rain while canopy 1406 is extended. Canopy supports 1408 may be telescoping and/or may hinge to store and setup canopy 1106.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A utility rack comprising:
  an upper assembly, the upper assembly comprising a rectangular table portion that rigidly connects a first side rail to a second side rail;
  a first side assembly forming a third side rail, the first side assembly comprising one or more brackets that connect the first side assembly to the upper assembly;
  a second side assembly forming a fourth side rail, the second side assembly comprising one or more brackets that connect the second side assembly to the upper assembly;

wherein the first side rail and the second side rail each have an overall length between 50 inches and 62 inches;

wherein the third side rail and the fourth side rail each have an overall length between 25 inches and 40 inches;

wherein the first side assembly and the second side assembly each further comprise a generally flat section with one or more mounting holes, the mounting holes suitable for mounting the utility rack to a ground surface or to a vehicle;

wherein the first side assembly and the second side assembly connect to the upper assembly with the third side rail parallel to the fourth side rail, with the third side rail perpendicular to the first side rail, and with the fourth side rail perpendicular to the second side rail; and a first brace adjustably attached between the first side assembly and the second side assembly.

2. The utility rack of claim 1, wherein an overall height of the utility rack is between 28 inches and 32 inches.

3. The utility rack of claim 2, wherein the rectangular table portion is usable as a dining table, staging table, or game table.

4. The utility rack of claim 3, wherein the first side rail, the second side rail, the third side rail, and the forth side rail form a top portion of the utility rack with eight corners.

5. The utility rack of claim 4, wherein the eight corners are non-intersecting disconnected corners.

6. The utility rack of claim 5, wherein the first side assembly or the second side assembly further includes one or more D-ring connectors.

7. The utility rack of claim 5, wherein the first side assembly, the second side assembly, or the upper assembly further includes one or more hooks, clamps, hinges, or fasteners.

8. The utility rack of claim 7, wherein the one or more hooks, clamps, hinges, or fasteners are used to support one or more tools, containers, doors, weapons, camping gear, fencing supplies, outdoor gear, surveying tools, water containers, fuel containers, drawers, lock boxes, gardening supplies, or hunting gear.

9. The utility rack of claim 5, wherein the top portion of the utility rack includes one or more lights attached to the first side rail, the second side rail, the third side rail, or the fourth side rail.

10. The utility rack of claim 9, wherein the one or more lights are powered by solar power.

11. The utility rack of claim 5, wherein the first side assembly and the second side assembly further include support structure and a second brace adjustably attached between the first side assembly and the second side assembly such that spools of wire, fencing, barbed wire, electrical wire, or hose can be spooled rotationally around an axis formed by the second brace.

12. The utility rack of claim 1, wherein the vehicle is a four wheel drive vehicle.

13. The utility rack of claim 1, wherein the vehicle is a UTV (utility task vehicle), S×S (side-by-side vehicle), a utility vehicle, or an off-road vehicle.

14. The utility rack of claim 5, wherein the first side rail, the second side rail, the third side rail, or the fourth side rail further comprise an extendable canopy.

15. The utility rack of claim 14, wherein the extendable canopy comprises one or more support arms extendable to support the canopy in an extended canopy position.

16. The utility rack of claim 5, wherein the rectangular table portion further comprises an extendable canopy.

* * * * *